(12) United States Patent
Wilson

(10) Patent No.: US 10,025,720 B2
(45) Date of Patent: Jul. 17, 2018

(54) CACHE ORGANIZATION AND METHOD

(71) Applicant: NXP USA, Inc., Austin, TX (US)

(72) Inventor: Peter J. Wilson, Leander, TX (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 15/646,195

(22) Filed: Jul. 11, 2017

(65) Prior Publication Data

US 2017/0308480 A1 Oct. 26, 2017

Related U.S. Application Data

(62) Division of application No. 13/962,429, filed on Aug. 8, 2013, now Pat. No. 9,734,080.

(51) Int. Cl.
*G06F 12/00* (2006.01)
*G06F 12/0895* (2016.01)

(52) U.S. Cl.
CPC .......... *G06F 12/0895* (2013.01); *Y02D 10/13* (2018.01)

(58) Field of Classification Search
CPC .............................. G06F 12/0895; Y02D 10/13
USPC ........................................................ 711/114
See application file for complete search history.

(56) References Cited

U.S. PATENT DOCUMENTS

| | | | |
|---|---|---|---|
| 5,493,664 A | 2/1996 | Doi | |
| 5,974,505 A * | 10/1999 | Kuttanna | ............ G06F 12/0859 711/118 |
| 7,308,557 B2 | 12/2007 | Arndt et al. | |
| 2007/0067569 A1 | 3/2007 | Vittal et al. | |

OTHER PUBLICATIONS

Witchel, Emmett et al., "Direct Addressed Caches for Reduced Power Consumption," MIT Laboratory for Computer Science, Cambridge, MA; 24th International Symposium on Microarchitecture (MICRO-34), Austin, TX, Dec. 2001; printed from «http://www.ai.mil.edu/projects/oxygen/oxygen-book2001/Section1-Handy21/H21-03.pdf» on Feb. 21, 2013, 22 pages.
Peri, Ramesh V. et al., "Addressing Mode Driven Low-Power Data Caches for Embedded Processors," Intel Corporation, Austin, TX; Proceedings of the 3rd Workshop on Memory Performance Issues, Proceedings of the 3rd Workshop on Memory Performance Issues, in conjunction with the 31st International Symposium on Computer Architecture 2004, Munich, Germany, Jun. 20, 2004, 14 pages.
MA. Albert et al., "Way Memoization to Reduce Felch Energy in Instruction Caches." MIT Laboratory for Computer Science, Cambridge, MA; printed from «http://scale.eecs.berkeley.edu/papers/dicache-wced2001.pdf» on Feb. 21, 2013, 8 pages.

* cited by examiner

*Primary Examiner* — Jae Yu

(57) ABSTRACT

A method and information processing system with improved cache organization is provided. Each register capable of accessing memory has associated metadata, which contains the tag, way, and line for a corresponding cache entry, along with a valid bit, allowing a memory access which hits a location in the cache to go directly to the cache's data array, avoiding the need to look up the address in the cache's tag array. When a cache line is evicted, any metadata referring to the line is marked as invalid. By reducing the number of tag lookups performed to access data in a cache's data array, the power that would otherwise be consumed by performing tag lookups is saved, thereby reducing power consumption of the information processing system, and the cache area needed to implement a cache having a desired level of performance may be reduced.

27 Claims, 5 Drawing Sheets

CACHE ORGANIZATION AND METHOD

BACKGROUND

Field of the Disclosure

This disclosure relates generally to the use of memory in an information processing system and, more specifically, to the use of a cache in an information processing system.

Description of the Related Art

Different types of memory require different amounts of time to retrieve data from them. Often, a type of memory capable of storing a large amount of data may require a relatively long time to access the data, while a type of memory that provides a relatively shorter time to access data may be impractical to implement on a scale sufficient to store a large amount of data, for example, due to size constraints of the faster memory. One well-known technique that is utilized to improve data access time while still allowing access to a large amount of data is to use a cache to store frequently accessed data. A cache is a relatively small amount of fast access memory that is mapped to the same address as a main memory having a slower access time. When information stored at a cache represents the most-current copy it is referred to as valid, and is accessed from the cache at the faster access time of the cache rather than from the main memory at the slower access time. When a cache does not store a valid copy of data being requested, the data is accessed from main memory at the slower access time of main memory. It will be appreciated, that information loaded from slower main memory can be loaded into the cache for subsequent accesses.

Data retrieved from main memory that are stored in a cache are generally referred to as being stored in cache lines. A cache line is portion of the cache memory that represents a number of contiguous memory locations, generally a power of two bytes in length. A cache line includes cache entries corresponding to such memory locations, such that a cache entry is an example of a portion of a cache line. Cache lines are aligned in main memory on a multiple of the cache line length. Each valid cache line stores a sequence of data from a target memory having a common address portion, referred to as a tag. In the cache, each cache line has an associated tag field where the tag of a cache line is stored to distinguish addresses of the information stored at the tag line from addresses associated with all other cache lines. To determine whether or not requested data is in cache, a tag lookup is performed at the cache to determine if a valid cache tag exists that matches a corresponding address portion of the requested data. A cache access wherein a tag lookup is performed is referred to as a normal tag-based access.

Various cache configurations impose various levels of constraint on where cache data from a particular main memory address may be stored. For example, a direct mapped cache allows only a single cache entry to be used for data from a particular main memory address, a fully associative cache allows data from a particular main memory address to be stored anywhere in the cache, and a set-associative cache allows data from a particular main memory address to be stored in any one of a particular number of locations in the cache. For example, a two-way set-associative cache allows data from a particular main memory address to be stored in any one of two cache locations. In order to determine whether data for a particular address is available in either of the two ways of the two-way set associative cache, two sets of tag look-ups need to be performed.

Caches thus provide improved access time and latency, but the necessity of performing tag lookups, especially for the more efficient set-associative cache organizations, expends an undesirable amount of energy. There is thus a need for a memory organization which provides the access benefits of a cache but with substantially reduced energy costs.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

Figure 1:
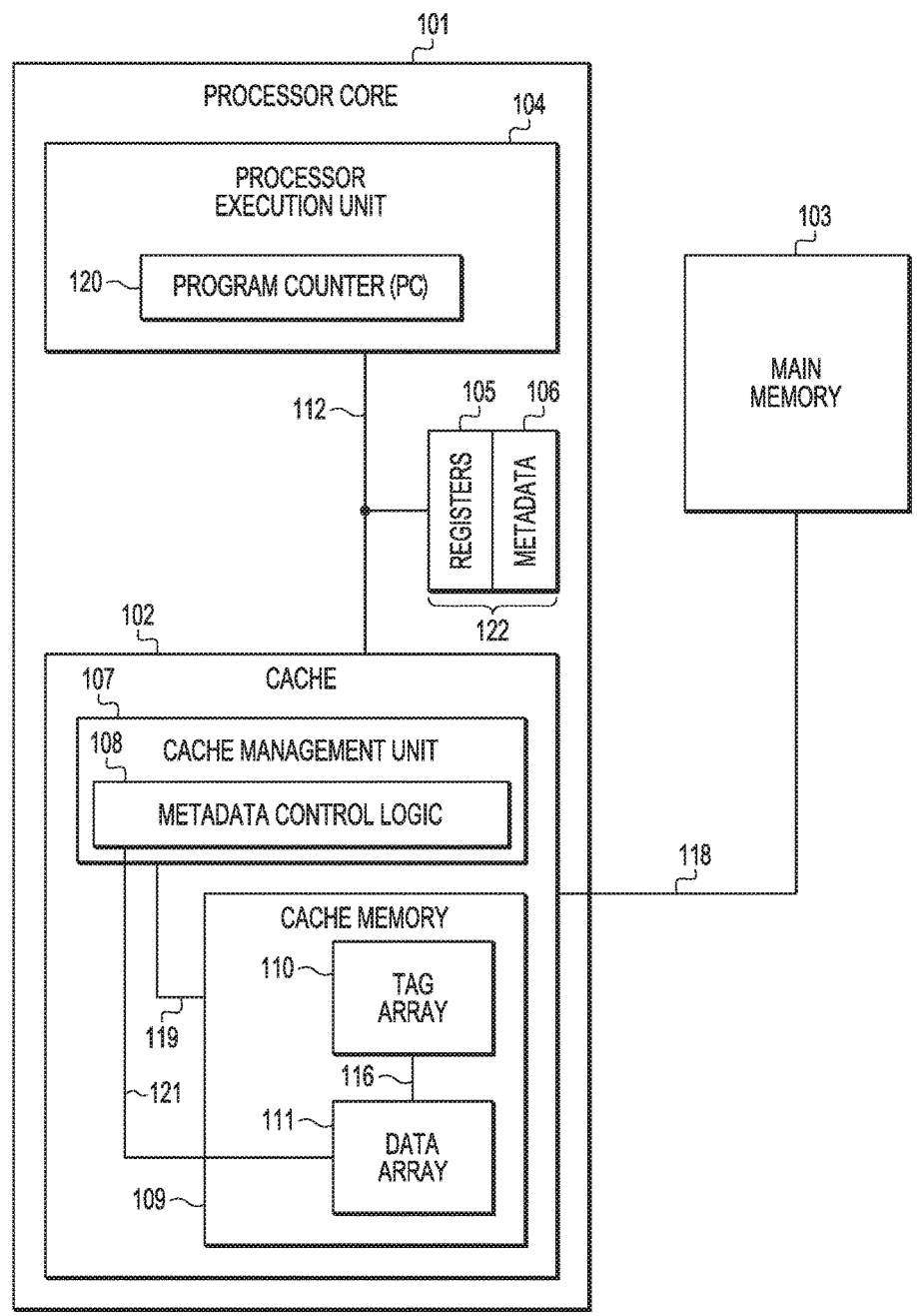
FIG. 1 is a block diagram illustrating an information processing system 100 in accordance with at least one embodiment.

A method and information processing system with improved cache organization is provided. At least one embodiment includes associating a processor register with cache-oriented metadata that can be used during register indirect access operations to access a cache memory independent of a cache tag lookup operation. A register indirect access operation is an access to a memory location that is identified by an address stored at specified register. The cache-oriented metadata of a register is information used during a register indirect access to access cache memory without the need to perform a cache tag lookup operation. By associating a processor register with cache-oriented metadata, such cache-oriented metadata does not need to be separately identified when executing an instruction that identifies the processor register. For example, the instruction does not need to explicitly identify the cache-oriented metadata, as the association of the processor register with the cache-oriented metadata allows the cache-oriented metadata to be identified via such association alone. As an example, by storing the cache-oriented metadata in a storage mechanism permanently associated in hardware to the processor register, the expenditure of time and energy to identify the cache-oriented metadata associated with the processor register can be avoided.

The metadata associated with a register can be stored, and therefore validated, when a value stored at the register corresponds to a valid cache address. As used herein, the term "valid cache address" refers to an address that corresponds to an address mapped to cache, and therefore would result in a cache hit during a cache access. Conversely, the metadata of a register can be invalidated when a value stored at the register is an invalid cache address, wherein an invalid cache address does not correspond to an address mapped to cache, e.g., a cache access using an invalid cache address would result in a cache miss. An address stored at a register that would result in a cache miss can be referred to as an out-of-bound address.

Validated metadata can be used to access a cache array independent of a cache tag lookup operation. For example, a cache tag lookup operation need not occur, e.g., be disabled, when valid metadata is available, thereby saving power. Alternatively, the metadata can be used to access the cache memory concurrently with a cache tag lookup operation, thereby saving time that would otherwise be needed to complete the tag lookup operation. (e.g., the cache tag operation can occur, but its results are not used.)

As used herein, a register is a form of storage in a computer readily accessible within a processor core, distinct from the general memory address space, and also distinct from specialized storage mechanisms such as caches, data buffers, so-called cache tag buffer arrays and so-called direct address registers. The implementation of a register, as part of a processor core itself, means that access is significantly faster than to the general memory. Unlike caches, data buffers, and so-called cache tag buffer arrays, which may be said to be architecturally invisible, in that, while they may improve performance, their presence or absence does not affect the results obtained from executing instruction code in a processor core of a processor architecture, registers are specified for a processor architecture and presumed to exist and to be accessible by instructions of the instruction set of the processor architecture, wherein the instruction set is the set of instructions prescribed as available for use under the processor architecture. Unlike so-called direct address registers, whose operation is meaningful only with respect to a cache, registers are capable of storing information whose values are independent of the existence and state of any cache. For example, registers capable of storing data may store that data to be used as an immediate operand, which a processor core uses to perform the basic operation of an instruction rather than to obtain another value used to perform the basic operation of the instruction.

Varying computer architectures may implement various types of register—for example, early machines generally had just one, the accumulator. In such a machine, a value could be fetched from memory and then some arithmetic or logical operation performed between that value and the value in the accumulator, with the result being written to the accumulator. Later machines added index registers, which could hold addresses, to make addressing memory more flexible. Still later, machines like the Motorola 68000 generalized the approach by providing multiple data registers and multiple address registers. Then reduced instruction set computing (RISC) machines lumped all the data and address registers together as a single group, the general purpose registers (GPRs), any one of which could hold an address or data.

As used herein, GPRs are registers capable of holding an address or data, wherein such registers are directly addressable by specific fields in instructions to be executed by the processor core, wherein the values set forth in such specific fields are not dependent upon a state of a cache—an instruction may specify 'add R1 to R2 and put the result in R3,' for example. Unlike general memory, which can be indirectly addressed ('load the value in memory held at the address specified by the contents of R4,' for example), GPRs belong to a distinct memory class and cannot be indirectly accessed in most architectures. The number of GPRs in a processor architecture is specified, unlike, for example, the existence of one or more caches, or the sizes of any caches, as the ability of a processor to properly execute instructions of its instruction set defined under its processor architecture is not dependent upon the existence or size of one or more caches, but instruction code to be executed on a processor presumes the existence of the specified number of GPRs to assure proper execution of the instructions of such instruction code.

Some or all of the registers capable of being used with register indirect accesses can have associated metadata. The metadata can include various types of information that identify the particular cache location corresponding to the register address. For example, for a Content Addressable Memory (CAM) based cache (e.g., a cache that stores a tag at each line of a CAM array and, in response to a tag hit, returns information from a data array line that corresponds to the hit CAM line) the metadata can include information identifying the corresponding line of a cache memory that would otherwise have been identified by a tag lookup operation. In addition, the metadata can include a valid bit that, when asserted, indicates the metadata is valid. In another example, for a memory-based cache (e.g., a cache having its tag information and data information stored in random access memory that is accessed by logic implemented in hardware or software) the metadata can include address information that corresponds to one or more addresses of a random access memory.

Thus, the technique described herein can be said to "memoize" cache lookup information in metadata associated with a register used for memory access. Such a technique can be performed in response to specialized load/store instructions or in response to any load/store instruction being executed.

FIG. 1 is a block diagram illustrating an information processing system 100 in accordance with at least one embodiment. Information processing system 100 includes processor core 101, and main memory 103 that is not cache memory. Processor core 101 includes cache 102, processor execution unit 104, and processor register subsystem 122. Processor register subsystem 122 includes processor registers 105 and processor register metadata storage 106, wherein each register of processor registers 105 is associated with a corresponding metadata storage location 106. A processor register 105 stores a register content value, and a corresponding metadata storage location 106 stores cache-oriented metadata corresponding to the register content value (when the cache-oriented metadata is valid). As an example, the cache-oriented metadata may be stored with a register content value of its corresponding processor register 105. For example, the cache-oriented metadata may be stored in a metadata storage location 106 implicitly related to its corresponding processor register 105. It will be understood that the partitioning of the various features herein is by way of example, and can vary. For example, while cache 102 is illustrated as being part of the processor core 101, it will be appreciated that cache 102 may alternatively reside external to processor core 101.

Cache 102 includes cache management unit 107 and cache memory 109. Cache memory 109 includes cache tag array 110 and cache data array 111. In accordance with at least one embodiment, an information processing system is a CAM-based data cache that is organized so as to optionally decouple access of the cache data array from the tag array to allow the cache management unit 107 to access the cache data array 111 independent of the cache tag array 110.

Processor execution unit 104 is connected to processor register subsystem 122 and cache 102 via connection 112. Processor registers 105 are associated to processor register metadata storage 106 such that each of processor registers 105 is associated with a corresponding portion of processor register metadata storage 106. Processor register metadata storage 106 stores metadata which may serve as a pointer to a particular portion of cache data array 111 (e.g., a particular cache line of cache data array 111). Processor execution unit 104 can execute instructions having register indirect operands that result in data being loaded from stored to an address that is stored at one of the processor registers 105. Thus, a processor register 105 may store a memory address value as a register indirect operand of a data transfer instruction.

Cache management unit 107 is connected to main memory 103 via connection 118. Cache management unit 107 is connected to cache memory 109 of cache 102 via connection 119, and, by way of example, is presumed in include control circuitry that can access cache memory 109 and control circuitry that can access main memory 103. Cache management unit 107 includes metadata control logic 108, which is connected to cache data array 111 via connection 121. Metadata control logic 108 is an example of a cache-oriented metadata supervisory agent that may be used in an information processing system in accordance with at least one embodiment. While the connections of FIG. 1 are depicted as single lines, it should be understood that such connections may be implemented in a variety of ways which may include, for example, signal lines, serial buses, parallel buses, as appropriate, and may even be connected by implicit relationships of data, such as a relationship of cache tag array 110 to cache data array 111, wherein corresponding elements of cache tag array 110 and cache data array 111 may be arranged in cache memory 109 so as to share the same cache entry as a contiguous block of data within cache memory 109.

To implement at least one embodiment, for example, with respect to a data cache, some extra information (i.e., metadata) is associated with each register that allows the cache management unit 107 to access a location of the data array 111 directly, e.g., without the use of information at tag array 110, when it is already known that the particular location of the data array 111 has a tag that corresponds to the address of that register. Thus the cache 102 is configured so that the tag array and data array are decoupled, allowing the data array to be directly accessed by the cache management unit 107 using the metadata 106.

Figure 2:
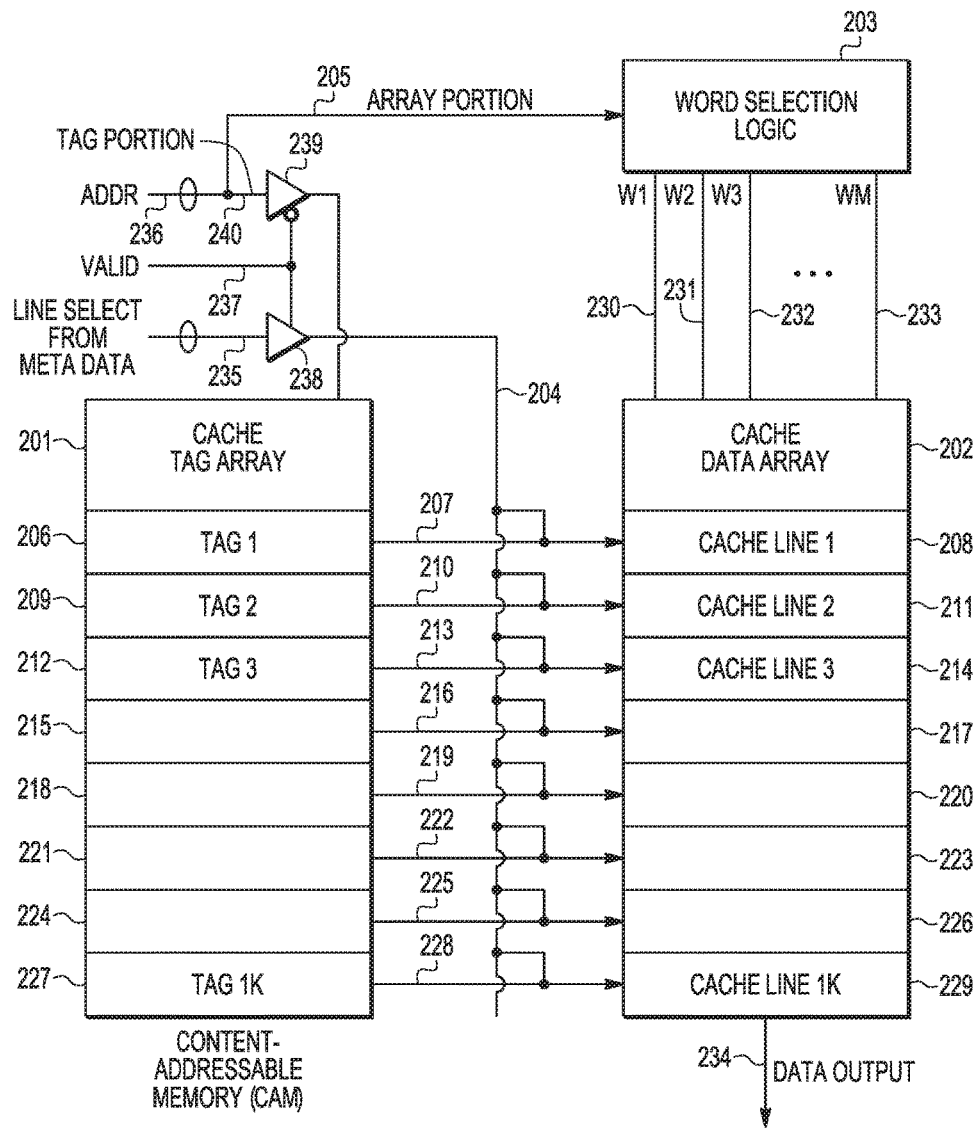
FIG. 2 is a block diagram illustrating a cache structure 200 including a cache tag array 201 and a cache data array 202 in accordance with at least one embodiment.

FIG. 2 is a block diagram illustrating a cache 200 corresponding to a particular embodiment of cache 102 of FIG. 1. Cache 200 includes a cache tag array 201 and a cache data array 202 in accordance with at least one embodiment. Cache tag array 201 includes a plurality of tag storage locations 206, 209, 212, 215, 218, 221, 224, and 227. Cache tag array 201 may be a content-addressable memory (CAM). Cache data array 202 includes a plurality of cache lines 208, 211, 214, 217, 220, 223, 226, and 229. Each tag of cache tag array 201 is associated with a respective cache line of cache data array 202, as shown by connections 207, 210, 213, 216, 219, 222, 225, and 228. Connection 207 connects tag 206 to cache line 208. Connection 210 connects tag 209 to cache line 211. Connection 213 connects tag 212 to cache line 214. Connection 216 connects tag 215 to cache line 217. Connection 219 connects tag 218 to cache line 220. Connection 222 connects tag 221 to cache line 223. Connection 222 connects tag 221 to cache line 223. Connection 225 connects tag 224 to cache line 226. Connection 228 connects tag 227 to cache line 229. Line select lines 204 from metadata connect individually to cache lines 208, 211, 214, 217, 220, 223, 226, and 229, allowing any of cache lines 208, 211, 214, 217, 220, 223, 226, and 229 to be accessed directly based on metadata without a need to use cache tag array 201 to access cache data array 202. Modifications to this description to encompass set-associative cache organizations will be apparent to those skilled in the art.

Cache data array 202 may be organized to provide a number (e.g., m) of words for each cache line, as shown by word connections 230, 231, 232, and 233, which connect word selection logic 203 to cache data array 202 on a word-by-word basis. Since line select lines 204 from metadata select a cache line in cache data array from among cache lines 208, 211, 214, 217, 220, 223, 226, and 229, a single set of word connections 230, 231, 232, and 233 may be used for all cache lines 208, 211, 214, 217, 220, 223, 226, and 229. In response to a register indirect operand memory operation, at least a portion of the value stored in the register specified by the operand of the memory access instruction is provided as an address (ADDR) 236 to cache 200. An array portion 205 of address 236 is provided to the word selection logic 203. A tag portion 240 of the address 236 is provided to a selector portion 239 that provides the tag portion 240 to the cache tag array 201 when valid line 237 indicates the metadata corresponding to the register to be invalid. Array portion 205 may, for example, provide a portion of the least significant bits (LSB) of address 236 to word selection logic 203 to cause word selection logic 203 to select one or more words from among word connections 230, 231, 232, and 233, causing cache data array 202 to output the selected word at data output 234. Line select metadata 235 corresponds to metadata of the register specified by the operand of the register indirect memory access instruction, and is provided to a selector portion 238 that provides the line select information metadata 235 to cache data array 202 when valid line 237 indicates the metadata corresponding to the register is valid. Thus, the metadata selects one of the cache lines of the cache data array in response to the metadata being valid, and the cache tag array is used to select one of the cache lines of the cache data array in response to the metadata being invalid. Once a cache line is selected, the information stored at the selected word locations is provided as data output 234 of the cache data array. Thus, a cache line of a cache data array of a cache may be selected based on cache-oriented metadata of a register, and a portion of the cache line holding information pertinent to the address stored in the register may be selected based upon a portion of the address stored in the register.

Figure 3:
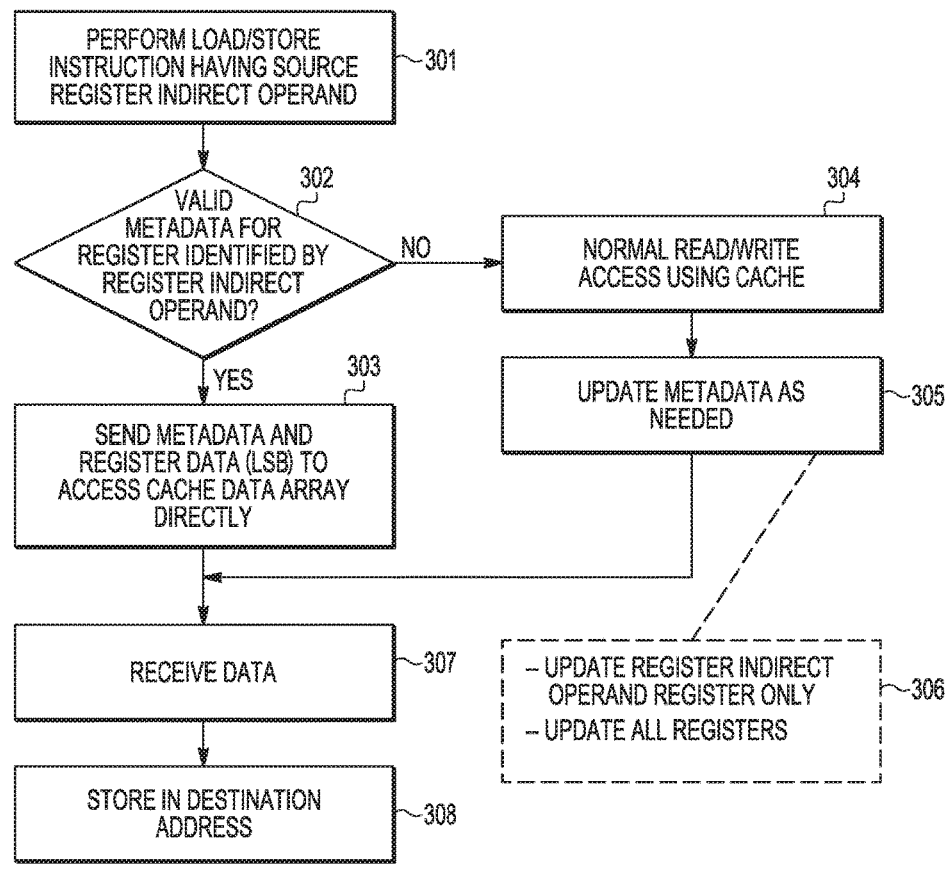
FIG. 3 is a flow diagram illustrating a method 300 in accordance with at least one embodiment.

FIG. 3 is a flow diagram illustrating a method 300 in accordance with at least one embodiment. Method 300 begins in block 301. In block 301, a processor core performs a load instruction or a store instruction (which, collectively may be referred to as a memory access instruction) having a source register indirect operand to access a memory location, for example, to load a value from a memory address that is stored at the source register into a destination location. Through the use of a cache, it may be possible to perform such a memory access instruction without having to perform a memory access to the actual memory location of the memory. Method 300 will be described with respect to a memory access instruction having a source register indirect operand, but may be implemented with respect to other memory access instructions using one or more registers to indirectly access a memory location within memory, for example, a memory access instruction having a destination register indirect operand, a memory access instruction having both a source register indirect operand and a destination register indirect operand, etc.

From block 301, the method continues to decision block 302. In decision block 302, a decision is made as to whether or not the metadata for a register identified by a register indirect operand of the load/store instruction (e.g., as a source address for a load instruction or a destination address for a store instruction) is valid. As an example, a valid bit of the metadata may be evaluated to determine if the metadata is valid. If the metadata is not valid, the method continues to block 304, where a normal read/write access (i.e., read access or write access) is performed. As part of the read/write access, a cache is evaluated to determine if the location being accessed is represented in the cache, e.g., through the use of a tag lookup. Assuming the data being accessed is not stored in cache, the data will be retrieved from memory and stored in the cache. Once the requested information is retrieved, from cache or memory, flow continues to block 305, where metadata is updated with information that identifies the cache line corresponding to the address being accessed, and a valid bit of the metadata is asserted. For example, the cache way and cache line corresponding to the address being accessed can be written to the metadata location that corresponds to the source register containing the address being accessed. By updating the metadata and marking it as valid, the need for a normal read/write access using the cache (e.g., including a tag lookup) may be avoided for a subsequent performance of a load/store instruction.

Dashed block 306 indicates various embodiments of implementing block 305, which include, but are not limited to, updating the metadata corresponding only to the register referenced by the register indirect operand only, and updating the metadata corresponding to all registers. For example, in response to loading a new cache line, an embodiment of block 305 may be performed by updating the metadata for all registers storing a value that corresponds to an address represented by the newly loaded cache line.

If, at block 302, the metadata is determined to be valid, the method continues to block 303, where the metadata and a least significant bit (LSB) portion of a register of registers 105 storing the address being accessed is used by the cache to access the cache data array directly (without the need for a tag lookup). Such a metadata based cache access may be referred to as a tag bypass cache access, as the use of a tag to access the cache data array is obviated and, therefore, use of the cache tag array is bypassed for such a metadata based cache access. From either block 303 or block 305, the method continues to block 307.

In block 307, data is received (e.g., via metadata-based retrieval from cache, via normal tag-based retrieval from cache, or, if necessary, via an actual memory access to the main memory). From block 307, the method continues to block 308. In block 308, the data is stored at a destination address (e.g., at a processor register, to a cache line accessed via metadata, to a cache line accessed via a tag lookup, or to a memory location in main memory).

Figure 4:
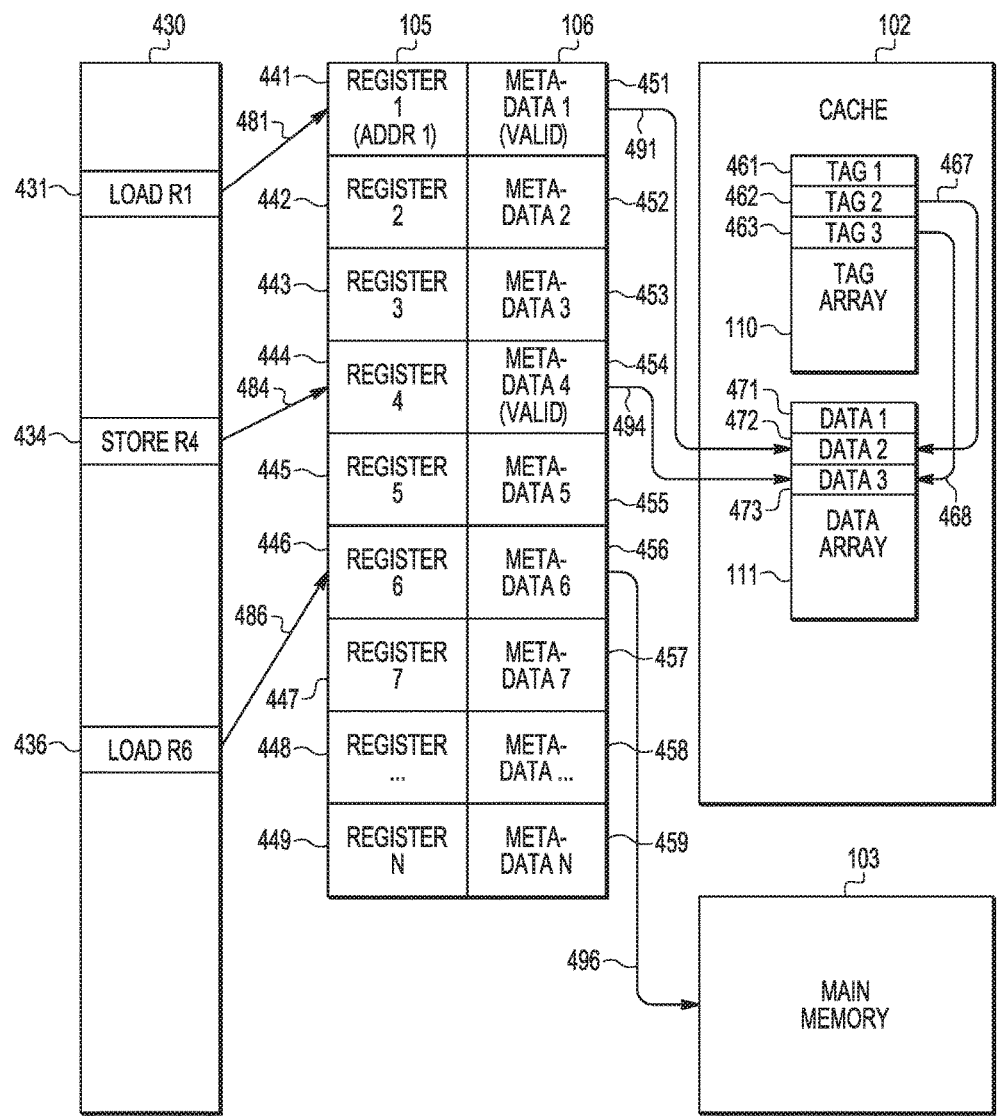
FIG. 4 is a block diagram 400 illustrating relationships between executing processor instruction code 430, including memory load and save instructions, and processor registers 105 and associated metadata 106.

FIG. 4 is a block diagram 400 illustrating relationships between executing processor instruction code 430, including memory load and save instructions, and processor registers 105 and associated metadata 106. FIG. 4 further illustrates the relationship between information stored at processor registers 105 and associated metadata 106 to main memory 103 and to cache 102.

In the specific embodiment illustrated, METADATA 1 and METADATA 4 of processor register metadata storage 106 contain valid metadata as indicated by the designator (VALID), which can be indicated by an asserted valid bit of the metadata, and the other registers illustrated at FIG. 4 contain invalid metadata as indicated by the lack of a the (VALID) designator, which can be indicated by a negated valid bit of the metadata. Registers having valid metadata store a value that is a valid cache address, e.g., the register data would result in a cache tag hit to tag array 461, assuming the register value is an address being accessed. Registers having invalid metadata would typically not store a value that would result in a cache tag hit the tag array 461. As described in greater detail below, instructions that indirectly access memory using a source register associated with valid metadata can access the cache data array 471 without first performing a tag look-up, as is discussed in greater detail below.

A load instruction is a processor instruction with a destination operand that specifies where data is to be stored. A destination operand can be referred to as a register direct operand in response to the destination operand specifying that the data is to be stored at a specified register (destination register). A destination operand can be referred to as a register indirect operand in response to the operand specifying that the data is to be stored at an address (destination address) stored at a specified register. Similarly, a load instruction can have a source operand that specifies from where the data to be stored is retrieved. The source operand can be referred to as an immediate operand in response to the operand being part of the load instruction. The source operand can be referred to as a register direct operand in response to the source operand specifying that the data is to be retrieved from a specific register (source register). The source operand can be referred to as a register indirect operand in response to the operand specifying that the data is to be retrieved from an address (source) stored at a specific register.

During operation, as processor instruction code 430 is executed, a load instruction 431 is executed having a register indirect operand that identifies register 441 as a register storing a source address to be accessed. Thus, as represented by link 481, register 441 stores an address (ADDR1) of main memory 103 that is to be read by the load instruction 431. Furthermore, register 441 is associated with valid processor register metadata 451 which indicates that the value stored at register 441 corresponds to a valid cache tag, e.g., the address stored at register 441 resides in data array 111. Thus, the address stored at register 441 can be accessed directly from the data array 111, using metadata 451 and ADDR1, without a cache tag lookup operation, as represented by link 491. For example, the metadata 451 can be an integer that identifies a specific cache line that includes the address stored at register 441. The cache 102 uses the information from the metadata 451, in combination with the address stored at register 441, to retrieve the desired information from cache data array 111 without having to perform a tag lookup via cache tag 462.

As processor instruction code 430 continues to be executed, a store instruction 434 is executed that identifies register 444 as storing a destination address to be accessed. Thus, as represented by link 484, register 444 stores an address of main memory 103 where store instruction 434 will store information. In particular, as register 444 is associated with processor register metadata 454, a valid bit of processor register metadata 454 is checked and found to be valid, which indicates that the value stored at register 444 corresponds to a valid cache address. In response, metadata 454 includes information that identifies the location of cache data array 111 corresponding to the address stored in register 444. This metadata is provided to the cache 102, as represented by link 494, and used to access the cache data array 111 directly without having to perform a tag lookup via cache tag 462.

As processor instruction code 430 continues to be executed, a load instruction 436 is executed that identifies register 446 as storing a destination address to be accessed. Thus, as represented by link 486, register 446 stores an address of main memory 103 where store instruction 436 will store information. In particular, as register 446 is associated with processor register metadata 456, a valid bit of processor register metadata 456 is checked and found to be invalid, which indicates that the value stored at register 446 does not correspond to a valid cache tag. In response, a normal memory access (i.e., an access not relying on metadata) is performed. The normal access may be performed by checking the cache tag array to determine if a valid tag exists for the address being accessed. If so, the processor register metadata 456 may be updated and marked as valid, and the data corresponding to the address being accessed may be obtained from the cache data array 111 (i.e., from the cache line of the cache data array 111 corresponding to the valid tag for the address being accessed). If not, a memory access to main memory 103 is performed, as shown by link 496.

In response to the memory access to main memory 103 illustrated by link 496, a value obtained from such memory access can be copied to a cache line of data array 111 of cache 102, and a tag of tag array 110 is configured to reference the cache line to the memory location of the memory access. In addition, the processor register metadata 456 is updated to reference the now valid cache line, and to be marked as valid. Thus, subsequent accesses to register 446 may use valid processor register metadata 456 to access the cache line of data array 111 of cache 102 without the need for a tag lookup and without the need for a memory access to main memory in the course of performing the subsequent access to register 446.

Processor registers 442, 443, 445, 447, and 449 and their corresponding processor register metadata 452, 453, 455, 457, and 459 are also shown in FIG. 4 but are not accessed by any processor instructions shown in processor instruction code 430, so they are not discussed in detail. Link 467 shows cache tag 462 of cache tag array 110 to be associated with cache line 472 of cache data array 111, and link 468 shows cache tag 463 of cache tag array 110 to be associated with cache line 473 of cache data array 111. Cache tag array 110 is shown to also include cache tag 461, and cache data array 111 is shown to also include cache line 471, but those elements of those arrays are not referenced by processor register metadata corresponding to registers accessed by processor instructions of processor instruction code 430, so they are not discussed in detail.

As shown, in response to the beginning of execution of a data transfer instruction identifying a register, such as a load or store instruction including at least one register as at least one of its operands, validity of cache-oriented metadata of the register is checked. In response to the cache-oriented metadata being determined to be valid, the cache-oriented metadata is used to perform a tag-bypass access of a cache line of a cache data array of the cache to which the cache-oriented metadata pertains, wherein the tag-bypass access accesses the cache line of the cache data array of the cache without relying on performing a cache tag lookup. In response to accessing information stored in the cache line of the cache data array of the cache, execution of the data transfer instruction may continue to completion. If multiple registers are identified by a data transfer instruction, multiple iterations of the foregoing may be performed to perform accesses for each of the identified registers so as to allow execution of the data transfer instruction to continue to completion.

It will be appreciated that the register metadata can be validated and invalidated using a variety of techniques. According to one embodiment, each time a new cache line is loaded, e.g., validated, the value of each register capable of being memorized is checked to determine if it contains a value that corresponds to an address of the newly loaded cache line. If so, its metadata is updated to point to the new cache line, and validated. Similarly, each time a cache line is invalidated, each register capable of being memorized can be checked to determine it points to the now invalidated cache line. If so, its metadata is invalidated.

According to another embodiment, only a register used in a register indirect access operation has its metadata updated and validated, e.g., each register is not checked each time a cache line is filled.

According to another embodiment, each cache line can have a set of flags that correspond to the memoized registers. Each time a register is memoized to point to a particular cache line, its corresponding flag is set. This allows the cache controller to quickly identify and invalidate metadata pointing to a particular cache line when the cache line is invalidated.

According to another embodiment, each time the value at a register changes the cache controller can be used to determine if the newly stored value corresponds to a valid cache address. If so, the registers metadata data is stored to point to the valid cache address.

Figure 5:
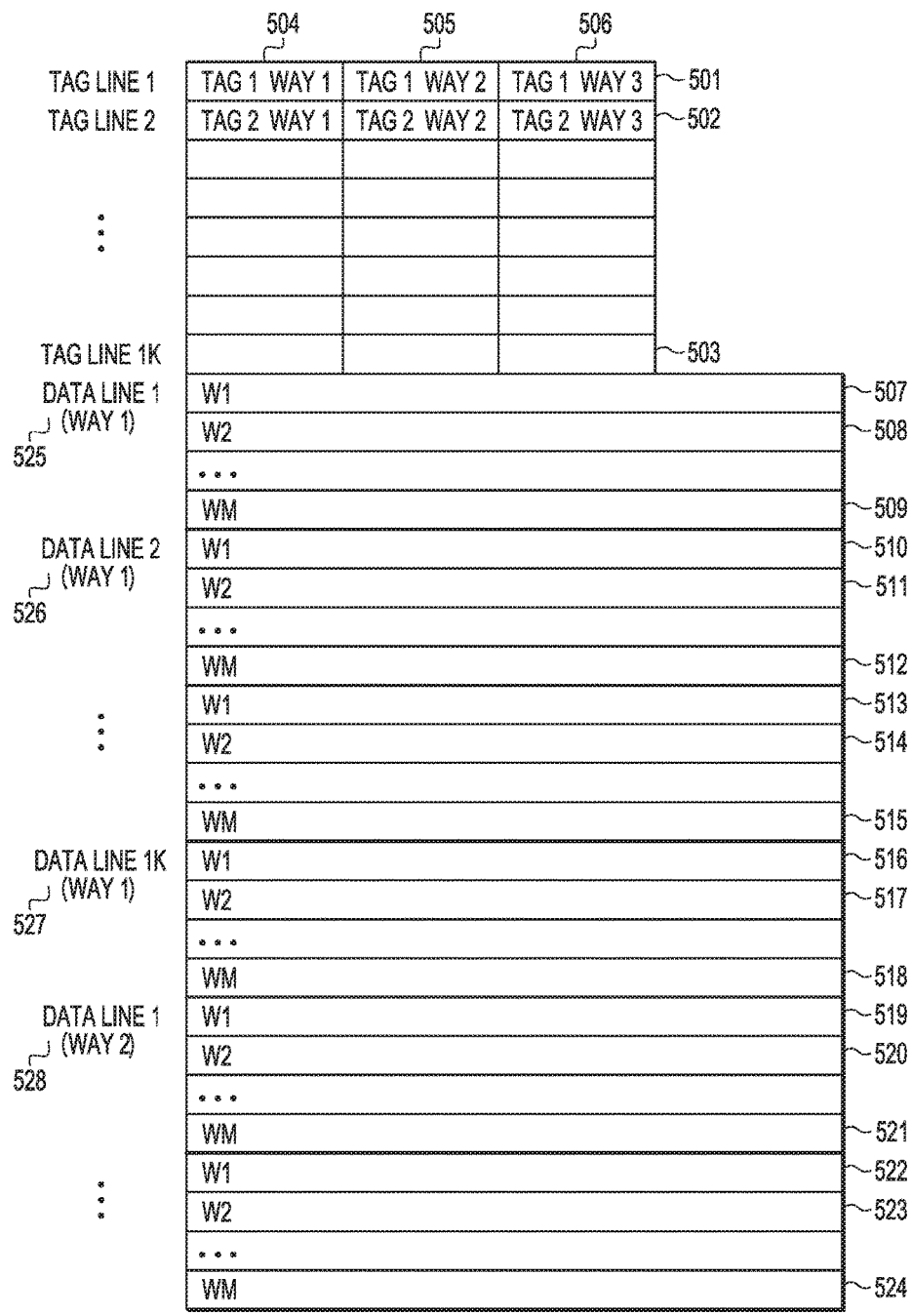
FIG. 5 is a block diagram illustrating a memory structure 500 which may be used to implement a cache in accordance with at least one embodiment.

FIG. 5 is a block diagram illustrating a random access memory (RAM) 500 which may be used to implement a cache in accordance with at least one embodiment. RAM 500 includes tag line entries, for example, tag lines entries 501, 502, and 503, and data lines entries, for example, data lines entries 525, 526, 527 and 528. Each of the entries 501-503 and 525-528 can represent location in linear address space of memory structure 500, that are accessed by a cache controller to implement cache functionality.

The cache implemented at RAM 500 can include more than one way, so separate (cache) data line entries may exist for each way of a data line. For example, data line entry 525 corresponds to a cache line of one way, and data line entry 528 corresponds to another cache line of a different way. In the illustrated embodiment, each of tag line entry includes a tag location for each way. For example, tag line entry 501 includes tag locations 504, 505, and 506. Each tag location corresponds to a specific data line of one of the ways. Accordingly, each of the tag line entries corresponds to as many of the data line entries as the number of ways of the cache and thus the number of elements in the tag line entry. As an example, element 504 of tag line entry 501 corresponds to data line entry 525 for one way of a data line and element 505 of tag line entry 501 corresponds to data line entry 528 of another way of the same data line. By storing multiple tags at each tag line, a cache controller can perform multiple tag compare operations for each read tag line. It will be appreciated that in an alternate embodiment, each tag line could contain one tag location, which would require a cache controller to perform a single tag compare operation for each read tag line.

Each data line entry includes a plurality of words. As a first example, data line entry 525 includes words 507, 508, and 509. As a second example, data line entry 526 includes words 510, 511, and 512. As a third example, a subsequent data line entry includes words 513, 514, and 515. As a fourth example, data line entry 527 includes words 516, 517, and 518. As a fifth example, data line entry 528 includes words 519, 520, and 521. As a sixth example, a subsequent data line entry includes words 522, 523, and 524. A word select value may be used to select a word within a data line entry, for example, by selecting an offset from the beginning of the data line entry.

Data line, way, and word selection may be performed by searching the tag line entries for a desired tag and using a word select value as an offset to select a word within a data line entry. However, if metadata for a register is valid, the metadata may be used to select a data line entry without a need to search tag line entries, and a word select value may be used to select a word within the data line entry. For example, the metadata could store the location of the first word (W1) of a data line containing data being accessed, and a portion of the least significant bits (LSBs) of the address being accessed, wherein such address is stored in the register, can be used to index a particular location within the data line.

In accordance with at least one embodiment, the program counter (PC) 120 of FIG. 1 is memoized. The PC is a specialized register that controls an order of instruction execution, typically incrementing from a memory location of one instruction to a memory location of the next subsequent instruction to be executed. For example, the technique described above with respect to a data cache may be used for an instruction cache (i-cache), with the simplification that it is the PC which points into the cache rather than a general purpose register.

In accordance with at least one embodiment, an information processing system has an ordinary data cache, with separate tag and data array, but the cache is organized so as to be decoupled, with the data array independently addressable and the cache-inherent cache line load/store hardware.

In accordance with at least one embodiment, cache tags of tag array 110 of cache 102 of FIG. 1 are stored in static random-access memory (SRAM) for better area efficiency (e.g., than with CAM) at the cost of having to perform serialized tag/data accesses. In other words, while SRAM may be implemented as a simpler and smaller semiconductor structure as compared, for example, to cache memory capable of enabling parallel tag/data accesses, tag/data accesses may be performed in serial manner with a SRAM-based cache implementation rather than in a parallel manner. The inefficiency can be mitigated by implementing an interleaved SRAM. If symmetric multiprocessor (SMP) snoopy cache coherence is not required (or is required only to provide a set of tags for snooping), then a cache can be simplified. The simplification is to remove the tags as a separate structure and store tags in the data array, making the whole cache simply a combined data structure, held for example, in SRAM. An example of such a memory structure with such combined information is shown in FIG. 5. Such an implementation works because with the improvements described herein the rate of tag lookups is much less frequent than with a normal cache, so there is no need to look up tags and data concurrently. For efficiency, such a memory-resident cache may be implemented as a multiport or an interleaved array so that multiple accesses may proceed concurrently provided they access different cache "ways."

In accordance with at least one embodiment, the SRAM is wide enough to hold n tag values where n is the degree of set associativity to be provided. As shown in the example illustrated in FIG. 5, tag lines, such as tag lines 501, 502, and 503, are wide enough to include multiple tag values, with tag line 501 shown as including tag values 504, 505, and 506. To reload a pointer's metadata, a lookup is performed into the SRAM (at a well-known address plus offset) of the tags corresponding to the address being looked up; all the tags are read out at once and compared in parallel. If there is a hit, the information processing system calculates the offset into the data portion of the array and proceeds as usual.

In accordance with at least one embodiment, the cache controller can implement the usual block move functionality to load data into the SRAM array and to write the data back when needed. The cache controller can also implement the usual eviction functionality (e.g., implementing a least recently used (LRU) replacement policy or another replacement policy) and the ability to write individual tags into the data SRAM. Since a cache is typically smaller than the general memory for which it holds information, not all of the information in general memory typically fits in the cache at any given time. Eviction functionality allows at least some portion of the information in the cache to be rendered no longer available in the cache, which frees a corresponding portion of the cache to accept other information corresponding to another portion of the information stored in general memory. Thus, for example, a cache line may be evicted from cache and replaced by another cache line corresponding to another portion of the information stored in general memory. Replacement of at least some portion of information in a cache corresponding to one portion of information stored in general memory by filling its portion of the cache with other information corresponding to another portion of the information stored in general memory is referred to as cache replacement.

In accordance with at least one embodiment, the instruction set architecture (ISA) of the processor has memory access instructions which use exactly one register to access memory (i.e., to store a memory address to be accessed). In some cases, it may be desirable to add a register which to "memoize" (i.e., to which to add metadata). At least one embodiment presumes memory is to be accessed via a register with associated metadata (e.g., that the ISA always uses a memoized register for register-based memory access instructions). As a result, architectures wherein memory access is generally done using an instruction which adds two registers to provide an "anonymous" address may involve additional accommodation. An architecture with such instructions may make use of an implementation in which the addition of the two registers is performed and the resulting sum is checked for validity according to the base register's metadata. For example, the base register (here r2) may be memoized, and the result of the sum of r2+r3 may be checked for being within-bounds of the r2 metadata. With fairly large offsets (literal and computed) possible, the hit rate for such a technique may be low.

A simpler way to provide compatibility may be to change the architecture. For example, in an architecture with variable instruction length, such as a possible variant of POWER VLE, while the variant above may exist, there may exist as well either or both of a short simplified load or store instruction with just two operands: 1d r1m, [r2m] (where either or both of r1 and r2 can be memoized registers as indicated by the suffix "m"). Alternatively, an expanded long instruction along the lines of 1d r1, r2, r3, [r4m]

can be created. The meaning of this instruction is that the sum of r2+r3 is written to r4m, and the value stored at r4 is used to access memory and place the result into r1. In this embodiment, the instruction only makes use of memoized registers with respect to the fourth operand (r4m), e.g., if registers r1, r2, or r3 are memoized, their metadata is not used with when executing this instruction. It will be appreciated that it may be desirable to limit the number of "pointer registers" (e.g., architectures with explicit pointer registers separate from the general-purpose registers (GPRs) may be attractive)—this reduces the number of instruction bits needed to specify the pointer register, giving instructions of the form ld r1, r2, r3, [p1];

where p1 specifies a pointer register, which is memoized, using perhaps just two or three bits of the instruction, where only four or eight pointer registers are available, for example. Such an architecture can save instruction bits by having fewer pointer registers than general-purpose registers (GPRs).

In accordance with at least one embodiment, a software-based cache may be implemented. The memory structure of FIG. 5 may be used to implement an example of such cache. In such a cache implementation, essentially all cache hardware may be removed and software may be used to manage caching. A software-based cache may provide cache-like behavior even if normal cache hardware is partially or entirely absent. One technique is to require software to "open" and "close" data structures, with copying to cache on an open and evicting from cache on a close. Data objects might be larger than local memory, which may be accommodated by opening, for example, individual rows or columns in an array.

In accordance with at least one embodiment, a multi-context, multi-threaded processor with associated tightly-coupled direct memory access (DMA) is used to implement software-based caching. For example, a tagless hardware cache management mechanism, as described above, may be implemented with tags and data in an interleaved SRAM, but with no hardware beyond the processor and (preferably) a DMA engine. Software may be used to search the tags and tell the DMA engine to move data between SRAM and main memory. A multi-threaded processor will allow progress in other threads while one thread is awaiting data from memory. Similar methods may be implemented in software as may otherwise be implemented in hardware.

When the metadata is valid, the machine has no need to access the cache tags, thereby reducing cache tag lookups and thus power. Since lookups are now rarer, a real efficiency is possible because the same SRAM array may be used for both tags and data.

In accordance with at least one embodiment, an enhanced processor register structure holds cache-addressing metadata associated with each register capable of being used to access memory, invalidating the metadata on power-up, checking validity of any change to the register, and invalidating the metadata when the corresponding cache content changes. For example, the metadata may be invalidated in response to an out-of-bound register update, wherein the out-of-bound register update is a register update accessing a memory location wherein a copy of the data at such memory location is not currently cached. As another example, normal load and store instructions for memory access may be used without a need for the instructions themselves to explicitly modify the metadata.

At least one embodiment provides implementation of smaller, lower-power caches, which may be realized in hardware only, in hardware and software, or in software only. At least one embodiment may be implemented for any core which can operate its cache data array as an SRAM in ordinary address space. At least one embodiment may be applied to any computer system which has at least one cache and operates under a power constraint.

In accordance with at least one embodiment, a method includes associating processor registers with cache-oriented metadata, performing a load or store instruction (which may be referred to as a data transfer instruction) that involves a processor register, checking whether a cache-oriented metadata entry for the processor register contains valid cache-oriented metadata, and, if so, using the cache-oriented metadata of the cache-oriented metadata entry for the processor register to access the data for performing the load or store instruction (e.g., accessing the data directly from a cache data array of a cache without having to perform a tag lookup via a cache tag array of the cache). If the cache-oriented metadata entry for the processor register does not contain valid cache-oriented metadata, a cache tag lookup (e.g., using a cache tag of the cache's cache tag array) is performed, any cache replacement in accordance with the cache's cache replacement strategy is performed, valid cache-oriented metadata is stored in the cache-oriented metadata entry for the processor register, and the cache-oriented metadata entry for the processor register is marked as valid (i.e., as containing valid cache-oriented metadata). According to one embodiment, associating the registers with corresponding cache-oriented metadata can include setting up a pointer, e.g., a cache data array physical address, to a cache line in a cache data array and marking the metadata as valid. According to one embodiment, checking whether a cache-oriented metadata entry contains valid cache-oriented metadata may be performed by making a decision as to whether or not an address of the load or store processor instruction is out of bound, wherein the load or store processor instruction refers to a register whose value relates to a memory location wherein a copy of the data at such memory location is not currently cached. In other words, an out-of-bound address may be understood to be an address of a memory location whose contents are not currently cached (which may be referred to as a non-cached address). If the cache contents are changed such that the cache data array no longer contains a cache line including the data to be accessed for performing the load or store instruction (e.g., if the cache line is evicted from the cache), the cache-oriented metadata pertaining to such data may be invalidated (e.g., replaced with nil) and the cache-oriented metadata entry may be marked as invalid (e.g., by clearing a validity indicator such as a validity flag). As another example, all metadata for all registers may be marked as invalid in response to detecting a change in cache contents or in response to detecting invalidity of cache-oriented metadata of at least one cache-oriented metadata entry.

In accordance with at least one embodiment, a method comprises associating a register with cache-oriented metadata and invalidating the cache-oriented metadata in response to an invalid cache address being written to the register. The cache-oriented metadata may comprise a pointer to a cache line in a cache data array of a cache. The cache-oriented metadata may enable access to a cache line of a cache without performing a cache tag lookup operation. The cache-oriented metadata may identify a cache line for a corresponding cache entry of a cache. The cache-oriented metadata may comprise a validity indicator to indicate the validity of the cache-oriented metadata, and the invalidating the cache-oriented metadata may comprise changing a value of the validity indicator.

The method may further comprise, in response to a cache line being evicted from a cache, invalidating second cache-oriented metadata. In response to the cache-oriented metadata being invalid, a cache tag lookup may be done, a cache replacement may be performed, the cache-oriented metadata may be updated to reflect the cache replacement, and the cache-oriented metadata may be validated. The method may further comprise, in response to beginning execution of a data transfer instruction referring to a register, wherein cache-oriented metadata corresponding to the register is invalid, performing a cache tag lookup, performing a cache replacement, updating the cache-oriented metadata to reflect the cache replacement, and validating the cache-oriented metadata. The register may be a program counter.

In accordance with at least one embodiment, an information processing system comprises a register with which cache-oriented metadata is associated and a cache-oriented metadata supervisory agent for invalidating the cache-oriented metadata in response to an invalid cache address being written to the register. The cache-oriented metadata may comprise a pointer to a cache line in a cache data array of a cache. The cache-oriented metadata may enable access to a cache line of a cache without performing a cache tag lookup operation. The cache-oriented metadata may identify a cache line for a corresponding cache entry of a cache. The cache-oriented metadata may comprise a validity indicator to indicate the validity of the cache-oriented metadata, and the cache-oriented metadata supervisory agent may invalidate the cache-oriented metadata by changing a value of the validity indicator. In response to a cache line being evicted from a cache, the cache-oriented metadata supervisory agent may invalidate second cache-oriented metadata. In response to the cache-oriented metadata being invalid, a cache lookup may be done, a cache replacement may be performed, the cache-oriented metadata may be updated to reflect the cache replacement, and the cache-oriented metadata may be validated. In response to beginning execution of a data transfer instruction referring to a register, wherein cache-oriented metadata corresponding to the register is invalid, a cache tag lookup may be performed, a cache replacement may be performed, the cache-oriented metadata supervisory agent may update the cache-oriented metadata to reflect the cache replacement, and the cache-oriented metadata supervisory agent may validate the cache-oriented metadata. The register may be a program counter.

In accordance with at least one embodiment, a method of accessing a cache comprises, in response to beginning of execution of a data transfer instruction, checking validity of first cache-oriented metadata of a first register, wherein the data transfer instruction refers to the first register and, in response to the first cache-oriented metadata being valid, using the first cache-oriented metadata to perform an access of a cache data array of the cache, wherein the using the first cache-oriented metadata avoids a tag lookup of a tag in a cache tag array of the cache. The data transfer instruction may identify the first register. The data transfer instruction need not identify the first cache-oriented metadata. The method may further comprise, in response to the first cache-oriented metadata being invalid, accessing a tag array of the cache, updating the first cache-oriented metadata based on a cache line of a cache data array of the cache accessed via the accessing the tag array, and changing the validity of the first cache-oriented metadata to be valid. An instruction set of a processor executing the data transfer instruction may provide for the execution of the data transfer instruction regardless of whether the first cache-oriented metadata is valid or the first cache-oriented metadata is invalid. The method may further comprise, in response to performing a cache replacement resulting from the first cache-oriented metadata being invalid to fill a first portion of a cache data array of the cache from memory, determining that a second register stores a second address that is associated with a second cache location within the first portion of the cache data array, updating second cache-oriented metadata of the second register, and changing the validity of the second cache-oriented metadata to be valid, wherein the first register stores a first address that is associated with a first cache location within the first portion of the cache data array. The method may further comprise, in response to an invalid cache address being written to the first register, changing the validity of the first cache-oriented metadata to be invalid. Using the first cache-oriented metadata to perform an access of the cache data array of the cache may comprise selecting a first cache line of the cache data array of the cache based upon the first cache-oriented metadata of the first register and selecting a portion of the first cache line based upon a portion of a first address stored in the first register. The first cache-oriented metadata may be stored with a first register content value of the first register. The first register may be a general purpose register of a processor. The first register may store a memory address value as a register indirect operand of the data transfer instruction.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method of accessing a cache comprising:
   in response to beginning of execution of a data transfer instruction, checking validity of first cache-oriented metadata of a first register, wherein the data transfer instruction refers to the first register;
   in response to the first cache-oriented metadata being valid, using the first cache-oriented metadata to perform an access of a cache data array of the cache, wherein the using the first cache-oriented metadata avoids a tag lookup of a tag in a cache tag array of the cache; and
   in response to the first cache-oriented metadata being invalid, accessing a tag array of the cache, updating the first cache-oriented metadata based on a cache line of a cache data array of the cache accessed via the accessing the tag array, and changing the validity of the first cache-oriented metadata to be valid.

2. The method of claim 1 wherein the data transfer instruction identifies the first register.

3. The method of claim 2 wherein the data transfer instruction does not identify the first cache-oriented metadata.

4. The method of claim 1 wherein an instruction set of a processor executing the data transfer instruction provides for the execution of the data transfer instruction regardless of whether the first cache-oriented metadata is valid or the first cache-oriented metadata is invalid.

5. A method of accessing a cache comprising:
in response to beginning of execution of a data transfer instruction, checking validity of first cache-oriented metadata of a first register, wherein the data transfer instruction refers to the first register;
in response to the first cache-oriented metadata being valid, using the first cache-oriented metadata to perform an access of a cache data array of the cache, wherein the using the first cache-oriented metadata avoids a tag lookup of a tag in a cache tag array of the cache; and
in response to performing a cache replacement resulting from the first cache-oriented metadata being invalid to fill a first portion of a cache data array of the cache from memory, determining that a second register stores a second address that is associated with a second cache location within the first portion of the cache data array, updating second cache-oriented metadata of the second register, and changing the validity of the second cache-oriented metadata to be valid, wherein the first register stores a first address that is associated with a first cache location within the first portion of the cache data array.

6. The method of claim 1 further comprising:
in response to an invalid cache address being written to the first register, changing the validity of the first cache-oriented metadata to be invalid.

7. The method of claim 1, wherein using the first cache-oriented metadata to perform an access of the cache data array of the cache comprises selecting a first cache line of the cache data array of the cache based upon the first cache-oriented metadata of the first register and selecting a portion of the first cache line based upon a portion of a first address stored in the first register.

8. The method of claim 1 wherein the first cache-oriented metadata is stored with a first register content value of the first register.

9. The method of claim 1 wherein the first register is a general purpose register of a processor.

10. The method of claim 1 wherein the first register stores a memory address value as a register indirect operand of the data transfer instruction.

11. An information processing system comprising:
a register, in a processor core, to store first cache-oriented metadata;
a cache-oriented metadata supervisory agent to:
check validity of the first cache-oriented metadata of the first register in response to beginning of execution of a data transfer instruction, wherein the data transfer instruction refers to the first register,
in response to the first cache-oriented metadata being valid, to use the first cache-oriented metadata to perform an access of a cache data array of the cache, wherein the use the first cache-oriented metadata avoids a tag lookup of a tag in a cache tag array of the cache, and
in response to the first cache-oriented metadata being invalid, the cache-oriented metadata supervisory agent to access a tag array of the cache, to update the first cache-oriented metadata based on a cache line of a cache data array of the cache accessed via the access of the tag array, and to change the validity of the first cache-oriented metadata to be valid.

12. The information processing system of claim 11 wherein the data transfer instruction identifies the first register.

13. The information processing system of claim 12 wherein the data transfer instruction does not identify the first cache-oriented metadata.

14. The information processing system of claim 11 wherein an instruction set of the processor core to execute the data transfer instruction provides for the execution of the data transfer instruction regardless of whether the first cache-oriented metadata is valid or the first cache-oriented metadata is invalid.

15. An information processing system comprising:
a register, in a processor core, to store first cache-oriented metadata;
a cache-oriented metadata supervisory agent to:
check validity of the first cache-oriented metadata of the first register in response to beginning of execution of a data transfer instruction, wherein the data transfer instruction refers to the first register,
in response to the first cache-oriented metadata being valid, to use the first cache-oriented metadata to perform an access of a cache data array of the cache, wherein the use the first cache-oriented metadata avoids a tag lookup of a tag in a cache tag array of the cache,
in response to performing a cache replacement resulting from the first cache-oriented metadata being invalid to fill a first portion of a cache data array of the cache from memory, the cache-oriented metadata supervisory agent to determine that a second register stores a second address that is associated with a second cache location within the first portion of the cache data array, to update second cache-oriented metadata of the second register, and to change the validity of the second cache-oriented metadata to be valid, wherein the first register stores a first address that is associated with a first cache location within the first portion of the cache data array.

16. The information processing system of claim 11 further comprising:
in response to an invalid cache address being written to the first register, the cache-oriented metadata supervisory agent to change the validity of the first cache-oriented metadata to be invalid.

17. The information processing system of claim 11, wherein using the first cache-oriented metadata to perform an access of the cache data array of the cache comprises:
the cache-oriented metadata supervisory agent to select a first cache line of the cache data array of the cache based upon the first cache-oriented metadata of the first register, and to select a portion of the first cache line based upon a portion of a first address stored in the first register.

18. The information processing system of claim 11 wherein the first register stores a memory address value as a register indirect operand of the data transfer instruction.

19. The information processing system of claim 11 wherein the first register is a general purpose register of a processor.

20. A method of accessing a cache comprising:
storing an operand address of an operand of a data transfer instruction with cache-oriented metadata indicating a location of the operand in a register;

in response to beginning of execution of the data transfer instruction, checking validity of cache-oriented metadata, wherein the data transfer instruction refers to the register; and in response to the first cache-oriented metadata being valid, using the cache-oriented metadata to perform a direct access of a cache data array of the cache, wherein the using the cache-oriented metadata avoids a tag lookup of a tag in a cache tag array of the cache.

21. The method of claim 20 wherein the data transfer instruction identifies the first register.

22. The method of claim 21 wherein the data transfer instruction does not identify the first cache-oriented metadata.

23. The method of claim 20 further comprising:
in response to the cache-oriented metadata being invalid, accessing the cache tag array of the cache, updating the cache-oriented metadata based on a cache line of the cache data array of the cache accessed via the accessing the cache tag array, and changing the validity of the cache-oriented metadata to be valid.

24. The method of claim 23 wherein an instruction set of a processor executing the data transfer instruction provides for the execution of the data transfer instruction regardless of whether the first cache-oriented metadata is valid or the first cache-oriented metadata is invalid.

25. The method of claim 20 further comprising:
in response to performing a cache replacement resulting from the first cache-oriented metadata being invalid to fill a first portion of a cache data array of the cache from memory, determining that a second register stores a second address that is associated with a second cache location within the first portion of the cache data array, updating second cache-oriented metadata of the second register, and changing the validity of the second cache-oriented metadata to be valid, wherein the first register stores a first address that is associated with a first cache location within the first portion of the cache data array.

26. The method of claim 20 further comprising:
in response to an invalid cache address being written to the first register, changing the validity of the first cache-oriented metadata to be invalid.

27. The method of claim 20, wherein using the first cache-oriented metadata to perform an access of the cache data array of the cache comprises selecting a first cache line of the cache data array of the cache based upon the first cache-oriented metadata of the first register and selecting a portion of the first cache line based upon a portion of a first address stored in the first register.

* * * * *